United States Patent
Kuriwada et al.

(10) Patent No.: US 12,384,960 B2
(45) Date of Patent: Aug. 12, 2025

(54) RESIN/PHOSPHOR COMPOSITE SCINTILLATOR, AND SCINTILLATOR ARRAY

(71) Applicant: MITSUBISHI CHEMICAL CORPORATION, Tokyo (JP)

(72) Inventors: Takeshi Kuriwada, Tokyo (JP); Takeshi Oomori, Tokyo (JP); Tomoyuki Kurushima, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 982 days.

(21) Appl. No.: 17/476,874

(22) Filed: Sep. 16, 2021

(65) Prior Publication Data
US 2022/0002617 A1 Jan. 6, 2022

Related U.S. Application Data

(63) Continuation of application No. PCT/JP2020/009169, filed on Mar. 4, 2020.

(30) Foreign Application Priority Data

Mar. 19, 2019 (JP) .................... 2019-050585

(51) Int. Cl.
*C09K 11/02* (2006.01)
*C09K 11/61* (2006.01)
(Continued)

(52) U.S. Cl.
CPC .......... *C09K 11/02* (2013.01); *C09K 11/7771* (2013.01); *G01T 1/20* (2013.01)

(58) Field of Classification Search
CPC ..... C09K 11/02; C09K 11/7771; C09K 11/61; C09K 11/68; G01T 1/2033; G01T 1/20;
(Continued)

(56) References Cited

U.S. PATENT DOCUMENTS

| | | | |
|---|---|---|---|
| 2012/0298876 | A1 | 11/2012 | Kaneko et al. |
| 2014/0014843 | A1 | 1/2014 | Ikeda et al. |

(Continued)

FOREIGN PATENT DOCUMENTS

| | | |
|---|---|---|
| JP | 2002006091 A | 1/2002 |
| JP | 2005030806 A | 2/2005 |

(Continued)

OTHER PUBLICATIONS

Machine translation of JP2006-266936A, 17 pages. (Year: 2006).*
(Continued)

*Primary Examiner* — Matthew E. Hoban
*Assistant Examiner* — Lynne Edmondson
(74) *Attorney, Agent, or Firm* — Element IP, PLC

(57) ABSTRACT

The present invention addresses the problem of providing a scintillator which has excellent impact resistance and favorable workability and moldability. The problem is solved by a resin-phosphor composite scintillator which contains a resin and a phosphor and is capable of converting irradiated radiation into visible light. In this composite scintillator, a brightness retention rate, which is measured 24 hours after 38-minute irradiation with an X-ray to a total irradiation dose of 13 kGy at a distance of 40 mm from a radiation source, is 65% or higher; the Rockwell hardness is 30 HRM or higher; and the content of the resin is not less than 10% by weight.

11 Claims, 1 Drawing Sheet

(51) Int. Cl.
*C09K 11/68* (2006.01)
*C09K 11/77* (2006.01)
*G01T 1/20* (2006.01)

(58) Field of Classification Search
CPC .......... G01T 1/2023; G21K 4/00; G21K 4/06; G21K 4/08
See application file for complete search history.

(56) References Cited

U.S. PATENT DOCUMENTS

| 2015/0309190 A1* | 10/2015 | Kinoshita | G01T 1/2002 427/553 |
| 2017/0160407 A1 | 6/2017 | Totsuka | |
| 2017/0199285 A1 | 7/2017 | Adachi et al. | |
| 2019/0018150 A1 | 1/2019 | Yemam et al. | |

FOREIGN PATENT DOCUMENTS

| JP | 2006266936 A | 10/2006 |
| JP | 2007248283 A | 9/2007 |
| JP | 2012247281 A | 12/2012 |
| WO | WO-2013140444 A1 | 9/2013 |
| WO | WO-2014080941 A1 | 5/2014 |
| WO | WO-2016047139 A1 | 3/2016 |
| WO | WO-2016158495 A1 | 10/2016 |

OTHER PUBLICATIONS

Combined Chinese Office Action and Search Report issued Nov. 24, 2022 in Patent Application No. 202080020302.9 (with English translation), 19 pages.

English translation of the International Preliminary Report on Patentability and Written Opinion issued Sep. 30, 2021 in PCT/JP2020/009169, 5 pages.

International Search Report issued Apr. 14, 2020 in PCT/JP2020/009169, 2 pages.

* cited by examiner

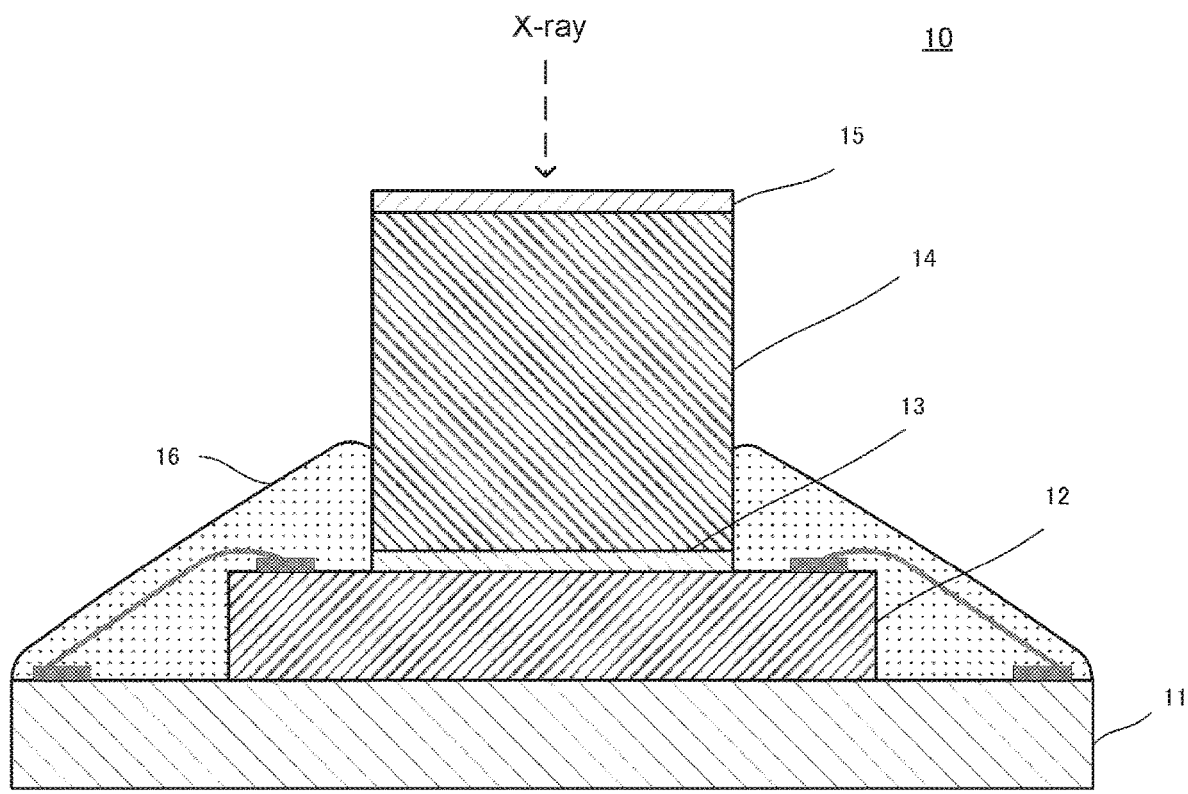

RESIN/PHOSPHOR COMPOSITE SCINTILLATOR, AND SCINTILLATOR ARRAY

CROSS REFERENCE TO RELATED APPLICATIONS

This application is a Continuation of PCT International Application No. PCT/JP2020/009169, filed on Mar. 4, 2020, which is claiming priority of Japanese Patent Application No. 2019-050585, filed on Mar. 19, 2019, the entire contents of which are incorporated herein by reference.

TECHNICAL FIELD

The present invention relates to a scintillator which converts radiation into visible light.

BACKGROUND ART

Scintillators, which are materials converting radiation such as X-rays into visible light, are utilized in, for example, medical applications such as X-ray imaging and radiation treatment, and industrial applications such as structural inspection and baggage screening.

Scintillators are used properly in accordance with the type and the intended use of the radiation to be converted and, for example, crystal scintillators typified by thallium-activated cesium iodide (CsI:Tl) and the like (e.g., Patent Document 1), ceramic scintillators obtained by sintering a phosphor such as praseodymium-activated gadolinium oxysulfide ($Gd_2O_2S:Pr$) (e.g., Patent Document 2) are known. However, crystal scintillators and ceramic scintillators have problems in that not only they have a low impact resistance and are thus easily cracked, but also it is difficult to process and mold these scintillators.

In order to solve these problems, scintillators composed of a mixed material obtained by kneading terbium-activated gadolinium oxysulfide ($Gd_2O_2S:Tb$) particles with a resin and curing the resultant have been proposed (e.g., Patent Documents 3 and 4).

RELATED ART DOCUMENTS

Patent Documents

[Patent Document 1] WO 2016/158495
[Patent Document 2] WO 2016/047139
[Patent Document 3] Japanese Unexamined Patent Application Publication No. 2006-266936
[Patent Document 4] Japanese Unexamined Patent Application Publication No. 2012-247281

SUMMARY OF THE INVENTION

Problems to be Solved by the Invention

However, the scintillators disclosed in Patent Documents 3 and 4 have been found to have a low resistance to X-rays which is not at a practical level.

The present invention solves the above-described problems, and an object of the present invention is to provide a scintillator which has excellent impact resistance and favorable workability and moldability as well as good X-ray resistance.

Means for Solving the Problems

The present inventors intensively studied to solve the above-described problems and consequently discovered that, in a resin-phosphor composite scintillator whose brightness retention rate and hardness are controlled to be certain values or higher by selecting an appropriate resin and incorporating the resin in a specific amount or greater, not only coloring of the resin caused by X-ray irradiation but also damage to a phosphor can be reduced, and the composite scintillator thus has good X-ray resistance, thereby completing the present invention.

The present invention encompasses the followings.

[1] A resin-phosphor composite scintillator, comprising a resin and a phosphor and being capable of converting irradiated radiation into visible light,
  wherein
  a brightness retention rate, which is measured 24 hours after 38-minute irradiation with an X-ray to a total irradiation dose of 13 kGy at a distance of 40 mm from a radiation source, is 65% or higher,
  the Rockwell hardness is 30 HRM or higher, and
  the content of the resin is not less than 10% by weight.

[2] The composite scintillator according to [1], which is in the form of a plate having a thickness of 500 µm or greater.

[3] The composite scintillator according to [1] or [2], wherein the resin is a cured product obtained using a cationic polymerization initiator.

[4] The composite scintillator according to [1] or [2], wherein the resin has an epoxy equivalent of 190 or more.

[5] The composite scintillator according to [1] or [2], wherein the resin has a cyclic structure which contains no double bond.

[6] The composite scintillator according to [1] or [2], wherein the resin contains at least one selected from hydrogenated epoxy resins and epoxy silicone resins.

[7] The composite scintillator according to any one of [1] to [6], wherein the content of the phosphor is 30% by weight to 90% by weight.

[8] The composite scintillator according to any one of [1] to [7], having an afterglow of 100 ppm or less after 20 ms when irradiated with a 16-Gy X-ray.

[9] The composite scintillator according to any one of [1] to [8], wherein the phosphor contains at least one selected from the group consisting of a GOS phosphor, a CWO phosphor, a CsI phosphor, and a garnet-based phosphor represented by a GAGG phosphor.

[10] The composite scintillator according to any one of [1] to [9], wherein the phosphor is in the form of particles.

[11] The composite scintillator according to any one of [1] to [10], wherein the phosphor has an average particle size of 0.1 µm or more and 50 µm or less.

[12] A composite scintillator array, comprising a plurality of the composite scintillators according to any one of [1] to [11] that are arranged linearly,
  wherein the composite scintillators forming the array each have a size of 10 mm$^3$ or smaller.

Effects of the Invention

According to the present invention, a scintillator which has excellent impact resistance and favorable workability and moldability as well as good X-ray resistance can be provided. Further, despite containing a resin and thus having a small phosphor amount, the scintillator exhibits an effect of having a brightness of an equivalent level with less afterglow as compared to a ceramic scintillator.

BRIEF DESCRIPTION OF THE DRAWING

The drawing is a schematic cross-sectional view illustrating one mode of a radiation detection apparatus.

MODE FOR CARRYING OUT THE INVENTION

One embodiment of the present invention is a resin-phosphor composite scintillator which contains a resin and a phosphor and is capable of converting irradiated radiation into visible light.

The composite scintillator is a member which contains a resin and a phosphor and converts irradiated radiation, such as X-rays, α-rays, β-rays and γ-rays, into light ranging from ultraviolet light to infrared light, mainly visible light, and the phosphor contained therein has a function of converting radiation into visible light.

The composite scintillator of the present embodiment is preferably a self-supporting member. The term "self-supporting" used herein means that the composite scintillator as a member is independently integrated into a device, without having a support member such as a substrate. Examples of the device include: medical devices, such as an X-ray imaging device, a PET device, and a CT device; and non-destructive testing devices, such as a transmission X-ray testing device and a Compton scattering X-ray testing device.

The drawing illustrates an example in which the composite scintillator is integrated into a radiation detection apparatus.

A radiation detection apparatus 10 has a configuration in which a photodetector 12, an adhesive layer 13, a composite scintillator 14, and a reflective film 15 are arranged on a support substrate 11. In one example, these members have a layered configuration.

The support substrate 11 is not particularly limited as long as it can support the photodetector 12 and the composite scintillator 14 that are layered thereon, and a glass substrate, a resin substrate or the like is usually used. By providing an electrically conductive layer on the surface of the support substrate, the photodetector 12 and the surface of the support substrate 11 may be electrically connected using a bonding wire or the like. The size and the thickness of the support substrate 11 are not particularly limited as long as the support substrate 11 can support the photodetector 12 and the composite scintillator 14; however, the size in the plane direction is usually the same as or larger than that of the photodetector 12. The composite scintillator 14 is supported on the support substrate 11 when integrated into the radiation detection apparatus 10, and the composite scintillator 14 itself is preferably, but not limited to, a self-supporting member which does not have a support substrate.

The photodetector 12 includes a photoelectric conversion section facing the composite scintillator 14, and has a function of converting fluorescence emitted by the composite scintillator 14 into an electrical signal or the like. The photodetector 12 is not particularly limited, and any known photodetector can be used as appropriate. In one mode, the photodetector 12 may be provided with a protective resin 16 for protection against external impact. The protective resin is not particularly limited as long as it can alleviate external impact.

The composite scintillator of the present embodiment contains a resin and a phosphor which form a complex (composite). By incorporating a resin, the composite scintillator has excellent impact resistance such that it is not broken or cracked like a crystal-type scintillator or a ceramic scintillator. Further, by incorporating a resin, the composite scintillator also has excellent workability and moldability since the resin functions as a binder. Moreover, despite that the phosphor amount in the composite scintillator is reduced due to the incorporation of a specific resin, the composite scintillator exhibits an effect of having a brightness of an equivalent level with less afterglow as compared to a ceramic scintillator.

The content of the resin in the composite scintillator is usually 10% by weight or more, and may be 12% by weight or more, 15% by weight or more, 20% by weight or more, 25% by weight or more, or 30% by weight or more. An upper limit thereof is usually 80% by weight or less, and may be 70% by weight or less, 60% by weight or less, or 50% by weight or less.

In the composite scintillator of the present embodiment, not only coloring of the resin caused by X-ray irradiation but also damage to the phosphor caused by X-ray irradiation can be reduced by using a specific resin, and the composite scintillator thus has good X-ray resistance. Examples of the resin contained in the composite scintillator include thermoplastic resins, thermosetting resins, and photocurable resins. More specific examples of the resin include (meth) acrylic resins (e.g., poly(methyl methacrylate)), styrene resins (e.g., polystyrenes and styrene-acrylonitrile copolymers), polycarbonate resins, polyester resins, phenoxy resins, butyral resins, polyvinyl alcohols, cellulose-based resins (e.g., ethyl cellulose, cellulose acetate, and cellulose acetate butyrate), phenolic resins, epoxy resins, hydrogenated epoxy resins, epoxy silicone resins, and silicone resins.

Thereamong, in order to allow the composite scintillator to have good X-ray resistance, the resin preferably contains at least one selected from hydrogenated epoxy resins and epoxy silicone resins. Further, the resin preferably has a cyclic structure which contains no double bond.

From other standpoint, namely the X-ray resistance, the resin preferably has an epoxy group, and the epoxy equivalent is preferably not less than 10, more preferably not less than 100, still more preferably not less than 190, particularly preferably not less than 195.

Particularly, when a hydrogenated epoxy resin is used, from the standpoint of the X-ray resistance, the epoxy equivalent is preferably not less than 100, more preferably not less than 190, still more preferably not less than 500, particularly preferably not less than 1,000, but usually 10,000 or less, preferably 5,000 or less, more preferably 3,000 or less.

When an epoxy silicone resin is used, from the standpoint of the X-ray resistance, the epoxy equivalent is preferably not less than 10, more preferably not less than 50, still more preferably not less than 100, yet more preferably not less than 190, but preferably 1,000 or lower, more preferably 500 or less, still more preferably 300 or less.

The viscosity of the resin at 25° C. is not particularly limited, and it is preferably 0.01 to 10,000 Pa·s, more preferably 0.1 to 1,000 Pa·s. From the standpoint of the phosphor dispersibility, the viscosity is particularly preferably 10 to 500 Pa·s when a hydrogenated epoxy resin is used, or 0.5 to 10 Pa·s when an epoxy silicone resin is used.

The molecular weight of the resin is not particularly limited, and the number-average molecular weight is usually 150 or more, but usually 1,500 or less, preferably 1,000 or less, more preferably 800 or less.

The content of the phosphor in the composite scintillator is usually 30% by weight or more, and may be 40% by weight or more, or 50% by weight or more. An upper limit thereof is usually 90% by weight or less, and may be 80% by weight or less, or 70% by weight or less.

The phosphor contained in the composite scintillator is not particularly limited as long as it is a phosphor that can be used in a scintillator application, and examples thereof include a GOS phosphor represented by $Gd_2O_2S$, a CWO phosphor represented by $CdWO_4$, a CsI (cesium iodide) phosphor, and a garnet-based phosphor represented by GAGG (gadolinium-aluminum-gallium-garnet). These phosphors can be used as appropriate in accordance with the type and the intended use of radiation.

The phosphor is preferably in the form of particles, and the d50 weight median particle size (median diameter) of the phosphor is not particularly limited; however, it is usually 0.1 μm or larger, preferably 0.5 μm or larger, but usually 50 μm or smaller, preferably 25 μm or smaller. The average particle size of the phosphor is a value obtained by measurement of the phosphor powder, which has been ultrasonically dispersed in water at an output of 25 W for 60 seconds, by a Coulter counter method.

The particle size distribution (quartile deviation QD= (d75−d25)/(d25+d75)) of the phosphor is also not particularly limited; however, the phosphor preferably has a sharp particle size distribution and usually, the QD is preferably 0.1 or more and 0.5 or less, more preferably 0.15 or more and 0.25 or less.

The composite scintillator may also contain a component other than the resin and the phosphor (other component). Examples of the other component include a dispersant, a plasticizer, a photopolymerization initiator/thermal polymerization initiator/cationic polymerization initiator, and an organic solvent. Thereamong, a thermal polymerization initiator is particularly preferred from the standpoint of potlife, and a cationic polymerization initiator is particularly preferred from the standpoint of obtaining good X-ray resistance. When the composite scintillator contains other component, the content thereof is usually 10 parts by weight or less, preferably 7.5 parts by weight or less, more preferably 5 parts by weight or less, still more preferably 2 parts by weight or less, particularly preferably 1.5 parts by weight or less, most preferably 0.8 parts by weight or less, with respect to 100 parts by weight of the resin.

A method of producing the composite scintillator is not particularly limited, and the composite scintillator can be produced by, for example, a production method including: the preparation step of preparing a phosphor composition that contains a phosphor and a resin; and the curing step of pouring the phosphor composition into a mold and curing the phosphor composition by heating or the like.

In the preparation step, a composition is prepared by mixing and/or kneading raw materials. In this process, the amount of voids in the resulting composite scintillator can be adjusted by the defoaming step of removing air bubbles.

The curing step is the step of curing a phosphor-containing composition, and a curing method can be selected as appropriate in accordance with the type of the resin. For example, when the resin in use is a thermosetting resin, the phosphor-containing composition is poured into a mold and cured by heating. When the resin in use is a UV-curable resin, similarly, the phosphor-containing composition is poured into a mold and cured by irradiation with UV radiation.

Further, by adjusting the type of the resin and/or the amount of an organic solvent, the viscosity can be adjusted such that the composition can be used in a 3D printer, and the composition can be cured and molded using a 3D printer. Any known method for molding a resin, such as extrusion molding or injection molding, may be applied. Moreover, the composition may be integrally molded with a reflective substrate and/or a partition wall, or may be directly molded on a photodetector.

The composite scintillator produced in the above-described manner has a void amount of preferably 10% by volume or less, more preferably 5% by volume or less, still more preferably 3% by volume or less. When the composite scintillator is molded thin, a high porosity makes cracking of the composite scintillator more likely to occur; therefore, the porosity is preferably low.

The composite scintillator of the present embodiment characteristically has a short afterglow and a high brightness, which is presumed to be attributed to that damage to the phosphor is limited since the composite scintillator is not sintered in contrast to a ceramic scintillator.

Particularly, when a GOS phosphor having a shorter afterglow than CsI is used, the composite scintillator has an extremely short afterglow since the phosphor is not exposed to a high temperature. Specifically, when the composite scintillator is irradiated with a 16-Gy X-ray, the afterglow at 20 ms thereafter is preferably 100 ppm or less, more preferably 90 ppm or less, still more preferably 85 ppm or less.

Further, the brightness retention rate, which is measured 24 hours after 38-minute irradiation with an X-ray to a total irradiation dose of 13 kGy at a distance of 40 mm from a radiation source, is preferably 65% or higher, more preferably 68% or higher, still more preferably 70% or higher.

In order to obtain such a composite scintillator having good X-ray resistance, it is necessary to select an appropriate resin and an appropriate polymerization initiator and, specifically, it can be achieved by an appropriate combination of the following (1) to (3): (1) incorporating a resin which has an epoxy group and an epoxy equivalent of not less than 190 or not less than 195, for example, at least one resin selected from hydrogenated epoxy resins and epoxy silicone resin; (2) reducing the amount of a polymerization initiator; and (3) using a cationic polymerization initiator.

The composite scintillator of the present embodiment has an excellent impact resistance and, specifically, the Rockwell hardness is 30 HRM or higher, preferably 35 HRM or higher, more preferably 40 HRM or higher.

The Rockwell hardness can be measured by a method according to JIS 7202-2 and, more specifically, the Rockwell hardness scale M (HRM) is measured using a Rockwell hardness meter DXT-1 manufactured by Matsuzawa Co., Ltd. with a ¼" steel ball measuring indenter at a load of 100 kg. In this process, each scintillator may be measured at a thickness of, for example, 5 mm.

Since the composite scintillator contains a resin, the composite scintillator can be produced in various shapes with various properties by selecting the type of the resin as appropriate.

Depending on the type of the resin to be used, the composite scintillator can be produced as a hard (high-hardness) composite scintillator, or as a soft (elastic) composite scintillator.

In the case of a soft (elastic) composite scintillator, the composite scintillator is flexible and thus can be arranged on a curved surface. This enables to apply a scintillator, which is conventionally and generally arranged on a planar substrate, onto a curved surface, so that the degree of freedom in the arrangement inside a device is improved.

Further, the composite scintillator of the present embodiment can be produced in various sizes. As a large-sized composite scintillator, the composite scintillator can be produced in a size of 10 mm$^3$ or larger. The composite scintillator can also be produced at a thickness of 500 μm or greater, or 1 mm or greater. As a small-sized composite scintillator, the composite scintillator can be produced in a size of 10 mm$^3$ or smaller. The composite scintillator can also be designed freely in terms of the shape, which may be a plate shape, a cylindrical shape, a disk shape, a rectangular parallelepiped shape with rectangular surfaces, a cubic shape, or the like.

A plurality of small-sized composite scintillators may be arranged linearly to obtain a composite scintillator array.

Moreover, the composite scintillator of the present embodiment can be made into chips or an array by a dicing process, and a reduction in the brightness caused by the dicing process can be inhibited by selecting an appropriate resin species. Particularly, a composite scintillator in which an epoxy silicone resin is used is preferred since it has a limited reduction in the brightness caused by a dicing process.

EXAMPLES

The present invention will now be described in detail by way of Examples; however, the present invention is not limited to the below-described Examples.

Comparative Example 1

After mixing a GOS:Tb powder (d50 weight median particle size: 9 μm, 20-ms afterglow: 100 ppm or less) as a phosphor with the epoxy resin shown in Table 1 as a resin main agent using a kneader such that the phosphor amount and the resin amount in the resulting scintillator would be 65% by weight and 35% by weight, respectively, 50 parts by weight of an amine-based curing agent was added as a resin auxiliary agent with respect to 100 parts by weight of the resin main agent. The resultant was thoroughly mixed using the kneader, and the thus obtained mixture was subsequently poured into a mold and heat-cured at 80° C. for 2 hours, whereby a resin-phosphor composite-type scintillator was obtained.

The thus obtained scintillator was processed into a shape of 70 m×70 m×1.5 mm (thickness), and the properties thereof were evaluated.

Comparative Examples 2 and 3 and Examples 1 to 6

Resin-phosphor composite-type scintillators were each obtained in the same manner as in Comparative Example 1, except that the resin main agent and the resin auxiliary agent as well as their contents were changed as shown in Table 1. It is noted here that the commercially available hydrogenated epoxy resins and epoxy group-containing silicone resins used in Examples all had a cyclic structure containing no double bond.

TABLE 1

Table 1

| | Resin main agent | Resin auxiliary agent | Content of auxiliary agent (parts by weight)* |
|---|---|---|---|
| Comparative Example 1 | Commercially available epoxy resin (Epoxy equivalent: 189, Viscosity at 25° C.: 10-20 Pa.s) | Commercially available amine-based curing agent | 50 |
| Comparative Example 2 | Commercially available epoxy resin (Epoxy equivalent: 189, Viscosity at 25° C.: 10-20 Pa.s) | Commercially available diallylsulfonium salt-based thermal acid generator | 1 |
| Comparative Example 3 | Commercially available hydrogenated epoxy resin (Epoxy equivalent: 205, Viscosity at 25° C.: 0.5-3 Pa.s) | Commercially available amine-based curing agent | 50 |
| Comparative Example 4 | Commercially available hydrogenated epoxy resin (Epoxy equivalent: 205, Viscosity at 25° C.: 0.5-3 Pa.s) | Commercially available boron-based thermal acid generator | 1 |
| Example 1 | Commercially available hydrogenated epoxy resin (Epoxy equivalent: 205, Viscosity at 25° C.: 0.5-3 Pa.s) | Commercially available diallylsulfonium salt-based thermal acid generator | 1 |
| Example 2 | Commercially available hydrogenated epoxy resin (Epoxy equivalent: 270, Viscosity at 25° C.: 0.1-2 Pa.s) | Commercially available diallylsulfonium salt-based thermal acid generator | 0.75 |
| Example 3 | Commercially available hydrogenated epoxy resin (Epoxy equivalent: 270, Viscosity at 25° C.: 0.1-2 Pa.s) | Commercially available diallylsulfonium salt-based thermal acid generator | 0.5 |
| Example 4 | Commercially available epoxy group-containing silicone (Epoxy equivalent: 200, Viscosity at 25° C.: 2-4 Pa.s) | Commercially available diallylsulfonium salt-based thermal acid generator | 1 |

TABLE 1-continued

Table 1

| | Resin main agent | Resin auxiliary agent | Content of auxiliary agent (parts by weight)* |
|---|---|---|---|
| Example 5 | Commercially available epoxy group-containing silicone (Epoxy equivalent: 200, Viscosity at 25° C.: 2-4 Pa.s) | Commercially available diallylsulfonium salt-based thermal acid generator | 0.7 |
| Example 6 | Commercially available epoxy group-containing silicone (Epoxy equivalent: 200, Viscosity at 25° C.: 2-4 Pa.s) | Commercially available diallylsulfonium salt-based thermal acid generator | 0.3 |

*content with respect to 100 parts by weight of resin main agent

Reference Example 1

A scintillator sheet (DRZ-high, manufactured by Mitsubishi Chemical Corporation) was prepared.

Reference Example 2

As a phosphor, a GOS:Pr powder (d50 weight median particle size: 9 μm, 20-ms afterglow: 100 ppm or less) was encapsulated in a soft steel capsule, and an HIP treatment was performed at a temperature of 1,300° C. for 2 hours under a pressure of 100 MPa to obtain a sintered body of $Gd_2O_2S$:Pr. The thus obtained sintered body was processed into a shape of 70 m×70 m×1.5 mm (thickness).

The following evaluation tests were conducted on each scintillator of Comparative Examples 1 to 3, Examples 1 to 6, and Reference Examples 1 and 2. The results thereof are shown in Table 2.

X-Ray Irradiation Conditions for Resistance Test
  X-ray generator: industrial continuous X-ray generator XGC0758R0, manufactured by JOB Corporation
  Output: 75 KV-4 mA
  Distance between radiation source and sample: 40 mm
  Irradiation time, total irradiation dose: 38 minutes, 13 kGy X-Ray Irradiation Conditions for Brightness Measurement
  X-ray generator: PORTA 100HF, manufactured by JOB Corporation
  Output: 80 kV-1.6 mAs
  Phantom: 75 mm-thick water
  Distance between radiation source and sample: 800 mm
  Detector: Rayence CMOS Flat Panel Sensor Model 1215A
  Software for sensitivity calculation: ImageJ <Scintillator Resistance Test>

For a resistance test, the main surface (surface with the largest area) of each scintillator was irradiated with an X-ray as described above, and a detector was applied to the back side of the X-ray-irradiated surface 24 hours after the X-ray irradiation to evaluate the brightness.

The brightness measured 24 hours after the X-ray irradiation with respect to the brightness measured prior to the X-ray irradiation was evaluated in terms of the brightness retention rate (%).

Further, the brightness measured 24 hours after the X-ray irradiation was evaluated in terms of the relative brightness (%), taking the brightness of the scintillator sheet prepared in Reference Example 1 as 100%. The results thereof are shown in Table 2.

Afterglow Measurement Conditions
  X-ray generator: PORTA 100HF, manufactured by JOB Corporation
  Output: 100 kV-20 mAs
  Distance between radiation source and sample: 305 mm
  Radiation dose: 16 Gy
  Detector: wide dynamic range photomultiplier unit, manufactured by Hamamatsu Photonics K.K.
  Wide dynamic range photomultiplier module: H13126
  Data collection unit: C12918-A1

<Afterglow Measurement Test>

Each scintillator was processed into a size of 34 mm×34 mm×1.5 mm (thickness). Each scintillator was irradiated with an X-ray under the above-described afterglow measurement conditions, and the afterglow after 20 ms was read out from a luminescence decay curve detected by the detector and evaluated by comparison with a value at Time 0. The results thereof are shown in Table 2.

<Rockwell Hardness Test>

By a method according to JIS 7202-2, the Rockwell hardness scale M (HRM) was measured using a Rockwell hardness meter DXT-1 manufactured by Matsuzawa Co., Ltd. with a ¼" steel ball measuring indenter at a load of 100 kg. Each scintillator was measured at a thickness of 5 mm. The results thereof are shown in Table 2.

Impact Resistance Test

Each scintillator was processed into a size of 34 mm×34 mm×5 mm, except that the scintillator sheet of Reference Example 1 was processed into a size of 34 mm×34 mm×0.5 mm. Each scintillator was dropped from a height of 30 cm onto a concrete floor with a corner facing down to evaluate the presence or absence of cracking and breakage.

As a result, a corner of the scintillator sheet of Reference Example 1 sustained minor breakage (crushed) and the sintered scintillator of Reference Example 2 was cracked; however, neither breakage nor cracking occurred on the composite scintillators of Comparative Examples 1 to 3 and Examples 1 to 6 (indicated as "good" for impact resistance in Table 2).

TABLE 2

Table 2

| | Brightness retention rate (%) | Relative brightness (%) | Afterglow (ppm) | Rockwell hardness (HRM) | Impact resistance |
|---|---|---|---|---|---|
| Comparative Example 1 | 1 | 0 | — | 83 | good |
| Comparative Example 2 | 41 | 18 | — | 88 | good |

TABLE 2-continued

Table 2

|  | Brightness retention rate (%) | Relative brightness (%) | Afterglow (ppm) | Rockwell hardness (HRM) | Impact resistance |
|---|---|---|---|---|---|
| Comparative Example 3 | 13 | 6 | — | 81 | good |
| Comparative Example 4 | 60 | 47 | 61 | 72 | good |
| Example 1 | 73 | 59 | 58 | 61 | good |
| Example 2 | 80 | 68 | — | 69 | good |
| Example 3 | 85 | 68 | — | 58 | good |
| Example 4 | 89 | 70 | 78 | 100 | good |
| Example 5 | 91 | 71 | — | 102 | good |
| Example 6 | 93 | 74 | — | 98 | good |
| Reference Example 1 | 98 | 98 | 500 | — | bad |
| Reference Example 2 | 98 | 71 | 118 | — | bad |

The composite scintillators of Examples, in which the combination of a hydrogenated epoxy resin and a cationic initiator and the content of the cationic initiator were adjusted, were found to have a high brightness retention rate and good X-ray resistance.

Further, comparing the ceramic scintillator of Reference Example 2 with the composite scintillators of Examples 4 to 6, it was found that the composite scintillators of these Examples, despite containing a resin and thus having a smaller phosphor amount, had a brightness equal to or higher than that of the ceramic scintillator of Reference Example 2.

Moreover, it was found that, as compared to the scintillator sheet of Reference Example 1 and the ceramic scintillator of Reference Example 2, the composite scintillators of Examples had shorter afterglows.

DESCRIPTION OF SYMBOLS

10: radiation detection apparatus
11: support substrate
12: photodetector
13: adhesive layer
14: composite scintillator
15: reflective film
16: protective resin

What is claimed is:

1. A resin-phosphor composite scintillator, comprising:
a resin; and
a phosphor;
wherein:
the scintillator is capable of converting irradiated radiation into visible light;
a brightness retention rate of the scintillator, when measured 24 hours after 38-minute irradiation with an X-ray to a total irradiation dose of 13 kGy at a distance of 40 mm from a radiation source, is 65% or higher;
a Rockwell hardness of the scintillator is 30 HRM or higher;
a content of the resin in the scintillator is not less than 10% by weight;
the resin is a cured product obtained using a cationic polymerization initiator;
the resin comprises at least one selected from the group consisting of a hydrogenated epoxy resin and an epoxy silicone resin; and
a content of the cationic polymerization initiator is 1.5 parts by weight or less with respect to 100 parts by weight of resin.

2. The composite scintillator according to claim 1, which is in the form of a plate having a thickness of 500 μm or greater.

3. The composite scintillator according to claim 1, wherein the resin has an epoxy equivalent of 190 or more.

4. The composite scintillator according to claim 1, wherein the resin comprises a cyclic structure which contains no double bond.

5. The composite scintillator according to claim 1, wherein a content of the phosphor in the scintillator is 30% by weight to 90% by weight.

6. The composite scintillator according to claim 1, wherein the scintillator exhibits an afterglow of 100 ppm or less after 20 ms when irradiated with a 16-Gy X-ray.

7. The composite scintillator according to claim 1, wherein the phosphor comprises at least one selected from the group consisting of a GOS phosphor, a CWO phosphor, a CsI phosphor, and a GAGG phosphor.

8. The composite scintillator according to claim 1, wherein the phosphor is in the form of particles.

9. The composite scintillator according to claim 1, wherein the phosphor has an average particle size of 0.1 μm to 50 μm.

10. A composite scintillator array, comprising a plurality of composite scintillators according to claim 1, wherein:
the scintillators are arranged linearly in the array;
each scintillator has a size of 10 mm$^3$ or smaller.

11. The composite scintillator according to claim 1, wherein the cationic polymerization initiator is a diallylsulfonium salt-based thermal acid generator.

* * * * *